United States Patent
Adams

(10) Patent No.: US 6,749,803 B2
(45) Date of Patent: Jun. 15, 2004

(54) OXIDATION RESISTANT RHENIUM ALLOYS

(75) Inventor: Robbie J. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 117 days.

(21) Appl. No.: 10/138,087

(22) Filed: May 3, 2002

(65) Prior Publication Data

US 2003/0206823 A1 Nov. 6, 2003

(51) Int. Cl.[7] ............................................. C22C 28/00
(52) U.S. Cl. ..................... 420/433; 148/407; 148/442
(58) Field of Search ........................ 420/433; 148/407, 148/442

(56) References Cited

U.S. PATENT DOCUMENTS

| | | | |
|---|---|---|---|
| 2,467,675 A | 4/1949 | Kurtz et al. .................... 75/22 |
| 3,969,186 A | 7/1976 | Thompson et al. ............ 176/68 |
| 4,067,742 A | 1/1978 | Fletcher et al. ................ 106/43 |
| 4,119,458 A | 10/1978 | Moore .......................... 75/170 |
| 4,155,660 A | 5/1979 | Takahashi et al. ........... 400/124 |
| 4,380,471 A | 4/1983 | Lee et al. ...................... 419/11 |
| 4,432,794 A | 2/1984 | Holleck ........................ 75/239 |
| 4,764,225 A | 8/1988 | Shankar et al. .............. 148/404 |
| 4,915,733 A | 4/1990 | Schutz et al. .................. 75/228 |
| 4,927,798 A | 5/1990 | Baldi .......................... 502/301 |
| 4,985,051 A | 1/1991 | Ringwood ..................... 51/309 |
| 5,262,202 A | 11/1993 | Garg et al. ............... 427/383.3 |
| 5,476,531 A | 12/1995 | Timm et al. ................... 75/240 |
| 5,577,263 A | 11/1996 | West ............................ 428/552 |
| 5,704,538 A | 1/1998 | Mittendorf ................... 228/194 |
| 5,722,034 A | 2/1998 | Kambara ....................... 419/26 |
| 5,730,792 A | 3/1998 | Camilletti et al. ...... 106/287.14 |
| 5,745,834 A | 4/1998 | Bampton et al. .............. 419/37 |
| 5,824,425 A | 10/1998 | Mittendorf ................... 428/655 |
| 5,853,904 A | 12/1998 | Hall et al. .................... 428/670 |
| 5,916,518 A | * 6/1999 | Chesnes ....................... 420/438 |
| 5,993,980 A | 11/1999 | Schmitz et al. .............. 428/633 |
| 6,039,920 A | 3/2000 | Koch et al. ................... 420/590 |
| 6,127,047 A | 10/2000 | Worrell et al. ............... 428/615 |
| 6,203,752 B1 | 3/2001 | Bewlay et al. .................. 419/6 |
| 6,284,357 B1 | 9/2001 | Lackey et al. ............... 428/220 |
| 6,306,524 B1 | 10/2001 | Spitsberg et al. |

FOREIGN PATENT DOCUMENTS

| | | | |
|---|---|---|---|
| CH | 221 059 A | 5/1942 | |
| EP | 1 123 908 A1 | 8/2001 | ........... C04B/35/38 |
| GB | 1 068 987 A | 5/1967 | |
| SU | 1804141 | 5/1996 | |

* cited by examiner

Primary Examiner—Andrew L. Oltmans
(74) Attorney, Agent, or Firm—Douglas A. Mullen, Esq.

(57) ABSTRACT

An alloy based on a refractory metal such as rhenium resists oxidation by the inclusion of alloying substances with affinity for oxygen or other oxidizing substances. This alloy has excellent high temperature strength and will resist oxidation. The alloy includes oxidation resistant substances, such as soluble metals, that attract oxygen and may form a protective oxide layer over the remaining portion of the rhenium-alloy part or piece. Such soluble alloying constituents may include chromium, cobalt, nickel, titanium, thorium, aluminum, hafnium, vanadium, silicon, aluminum, and yttrium.

19 Claims, No Drawings

OXIDATION RESISTANT RHENIUM ALLOYS

BACKGROUND OF THE INVENTION

1. Field of the Invention

This invention relates to wear-resistant materials and more particularly to wear-resistant alloys derived from refractory metals such as rhenium.

2. Description of the Related Art

Material scientists seek to exploit from available resources, namely those elements of the periodic table of elements, different materials having different characteristics that can be used for a variety of purposes and applications. Consequently, there is a great interest in developing conductors, insulators, soft materials, and hard materials from available substances and materials.

With respect to engines and mechanical components, wear resistance is typically a desired characteristic because it allows materials to last a longer time and users to consequently enjoy a cheaper cost per unit time or reduced operational costs. Even though a part may cost twice as much, it may last four times as long so is then approximately half as expensive as a cheaper part over a given time period.

One particularly useful metal is elemental rhenium. Rhenium has atomic number 75 in the periodic table of elements. It is known as a refractory metal which means it has a very high melting point as compared to other materials. Despite the fact that it has a very high melting point, rhenium is not necessarily wear-resistant. Rhenium metal melts at approximately 5756° F. (3180° C., 3453° Kelvin). However, rhenium begins to oxidize at a much lower temperature, of approximately 1000° F. (538° C., 811° K). Rhenium retains excellent ultrahigh temperature strength of approximately 6–9 Ksi (kips per square inch, 1000 pounds per square inch) at 4000° F. (2204° C., 2477° K). Far before it reaches this temperature, the oxidation temperature of rhenium becomes a factor and the oxidation of rhenium produces a volatile oxide that will continually evaporate from the surface of the rhenium part until the part has entirely vaporized.

This can lead to catastrophic failure as can be readily perceived as the evaporation of a part during operation would be much like the boiling away of a part made of dry ice. However, where oxygen is lacking, rhenium has been shown to retain high strength and to resist severe corrosion and wear both in established literature as well as independent tests. Such properties are present at room temperature operation and remain with rhenium even though the temperatures are elevated.

In prior literature, relevant alloying includes development of phase diagrams for several binary alloys of rhenium as well as rhenium-enhanced alloys such as those based on tungsten where rhenium is added to the matrix to enhance resulting properties. In such prior literature, rhenium has been a part of binary alloys such as in tungsten to increase ductility.

Rhenium has also been studied for its effect on chromium-based alloys. For steel, alloys with chromium are known that alloy the creation of "stainless steel." When alloyed with chromium in amounts greater than 11%, steel converts from a highly oxidation prone substance to a more corrosion-resistant alloy with the general elimination of rust. Similar concepts are known for use in "super alloys" and corrosion-resistive alloys.

However, the prior art does not well reflect the establishment of oxidation-resistant rhenium-based alloy. Consequently, as there is always a need for better materials and materials having better wear characteristics, the present invention provides a solution to a need that will always be felt for better materials.

Additionally, the art has not well addressed the wear that concentrates at small asperities which are microscopic metal protrusions that generally cause roughness on a surface such as a cast or focused metal. With respect to rhenium-based alloys, wear could be focused on such asperities and such wear would by friction create significant heat that would cause an alloyed rhenium to oxidize and vaporize.

In view of the foregoing disadvantages inherent in the known types of alloys and materials now present in the prior art, there is a need for wear-resistant rhenium-based alloys for use in environments where unalloyed or pure rhenium would be subject to oxidation and/or vaporization.

SUMMARY OF THE INVENTION

The present invention provides a family of new wear-resistant rhenium-based alloys for use in environments where unalloyed or pure rhenium would be subject to oxidation and/or vaporization.

The general purpose of the present invention, which will be described subsequently in greater detail, is to provide better materials for use in mechanically or otherwise stressful operating environments in order to provide better wear characteristics and function which are not anticipated, rendered obvious, suggested, or even implied by any of the prior art alloys, either alone or in any combination thereof.

By way of example only, the present invention is embodied in an alloy that has a refractory metal, particularly rhenium, that is subject to oxidation well below its melting point and well below the temperature at which it loses strength and may strengthen the metal by selective combination. This results in an alloy that better resists oxidation and that may have better (and at least as good) wear characteristics. The refractory metal is combined with other alloying materials, such as metals, that have a strong affinity for oxygen. Such alloying materials include the metals chromium, cobalt, nickel, titanium, thorium, aluminum, hafnium, and related elements on the periodic table. These particular elements are at least somewhat soluble in rhenium, if not completely soluble.

It is believed that such elements protect rhenium by forming an oxide on its surface. Once the oxide has formed on the surface of the alloyed part, further attack by oxygen is prevented by the oxide coating. This is a phenomenon that is well-known with aluminum that oxidizes in oxygen, but once the surface of an aluminum object has oxidized, further oxidation is prevented as oxygen cannot get to the unoxidized aluminum below the oxidized surface layer. Stainless steel also exhibits similar characteristics.

Consequently, those metals or other alloying agents that oxidize to form high boiling point oxides may well aid in the protection of the underlying rhenium alloy.

Using powder metallurgy, and possibly using free form fabrication (FFF) or casting, parts and components can be fabricated from rhenium-based alloys having oxygen-attracting qualities. The use of such techniques may render useful alloys with better wear and lower oxidation characteristics. Other features and advantages of the present invention will become apparent from the following description of the preferred embodiments which illustrate by way of example the principles of the invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

One embodiment is achieved by initially obtaining some amount of pure rhenium in order to provide a better and unadulterated alloy. Rhenium is a refractory metal and the process described herein may apply to other refractory metals that require protection from oxidation in order to obtain better wear-resistant characteristics or otherwise.

The alloys set forth herein may be fabricated by powder metallurgy at relatively low pressures and temperatures for refractory metals, on the order of 3,000–4,000 psi (pounds per square inch) at approximately 1800° F. (982° C., 1255.15° K) for rhenium. Alternatively, free form fabrication (FFF) or casting may also provide good results. This last option of casting is generally difficult and costly due to the very high melting temperature of rhenium. Additionally, due to the oxidation characteristics of rhenium, the ambient environment in which rhenium alloy is formed (as by powder metallurgy, free-form fabrication, and/or casting) may need to be neutral, reducing, and/or under vacuum in order to avoid oxidation. Practically, powder metallurgy and free form fabrication techniques are believed to be the most effective.

In terms of atomic percent, an alloy (designated herein as HRA30) composed of 60% rhenium, 20% cobalt, 15% chromium, and 5% magnesium has shown to lower the oxidation rate of pure rhenium by a factor of 10. Additional alloys using various percentages of cobalt, chromium, manganese, nickel, vanadium, silicon, aluminum, yttrium, titanium, thorium, hafnium, or other elements may also be used either alone or in combination with each other. Other elements or substances with affinity for oxygen that produce oxidation-protective coating for the underlying rhenium or rhenium alloy are appropriate for use in order to achieve the present invention. Additionally, such alloying substances are believed to be more effective if they are at least, if not completely, soluble in rhenium.

In one embodiment, a minimum of 50% rhenium atomic percent may be combined with cobalt in order to produce an alloy with desired characteristics. The atomic percent of cobalt may range from approximately 0% to 50%. Additionally, chromium may be added in an amount ranging from approximately 10–15% by atomic percent.

In another embodiment, known in the trade as Honeywell Alloy HRA33, the atomic percentages are as follows: rhenium approximately 55%, cobalt approximately 20%, chromium approximately 10%, nickel approximately 10% and manganese approximately 5%.

The alloys created herein cannot only be used as material by which components or parts may be formed, but also as a coating under which rhenium or other core components could be protected from oxidation and/or to increase wear resistance in elevated temperature environments such as those arising in operating jet engines. Under such circumstances, matching of coefficients of thermal expansion may prove useful and further research may be performed in this area. It is believed that those of ordinary skill in the art would not have to perform undue experimentation in order to achieve the alloys set forth herein in order to obtain the desired characteristics. Similarly, the same is also believed to be true for the use of the alloy of the present invention for coating underlying materials. For applications of the instant alloys as coatings, intermediate coatings may be used to enhance adhesion or otherwise between the outer alloy coating and the underlying substrate.

Other embodiments may include other materials for use as substances with an affinity for oxygen but that also partially or completely dissolve in the refractory metal, such as rhenium. The present invention provides a material alloy by which robust and durable parts may be achieved for use in hostile operating conditions such as those in jet engines or the like.

While the present invention has been described with reference to a preferred embodiment or to particular embodiments, it will be understood that various changes and additional variations may be made and equivalents may be substituted for elements thereof without departing from the scope of the invention or the inventive concept thereof. In is addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A rhenium-base oxidation-resistant alloy, comprising:
   at least fifty percent (50%) rhenium by atomic percent; and
   at least thirty percent (30%) of the alloy by atomic percent comprising:
      cobalt;
      chromium; and
      manganese; whereby
      an oxidation rate of a resulting alloy thereof is significantly diminished from that of pure rhenium.

2. A rhenium-base oxidation-resistant alloy as set forth in claim 1, wherein the cobalt further comprises:
   cobalt by atomic percent in a range from approximately 0% to 50%.

3. A rhenium-base oxidation-resistant alloy as set forth in claim 1, wherein the chromium further comprises:
   chromium by atomic percent in a range from approximately 0% to 15%.

4. A rhenium-base oxidation-resistant alloy as set forth in claim 1, wherein the manganese further comprises
   manganese by atomic percent in a range from approximately 0% to 10%.

5. A rhenium-base oxidation-resistant alloy as set forth in claim 1, comprising:
   nickel.

6. A rhenium-base oxidation-resistant alloy as set forth in claim 5, wherein the nickel further comprises:
   nickel by atomic percent in a range from approximately 0% to 15%.

7. A rhenium-base oxidation-resistant alloy as set forth in claim 1, wherein the oxidation rate is reduced or approximately zero up to 1200° F. compared to pure rhenium.

8. A rhenium-base oxidation-resistant alloy as set forth in claim 1, further comprising elements selected from the group consisting of:
   vanadium, silicon, aluminum, yttrium, and thorium.

9. An oxidation-resistant alloy, comprising:
approximately fifty-five percent (55%) rhenium by atomic percent;
approximately twenty percent (20%) cobalt by atomic percent;
approximately ten percent (10%) chromium by atomic percent;
approximately ten percent (10%) nickel by atomic percent; and
approximately five percent (5%) manganese by atomic percent; whereby
an oxidation rate of a resulting alloy thereof is approximately zero up to 1200° F. and a lower rate thereafter compared to pure rhenium.

10. An oxidation-resistant alloy as set forth in claim 9, further comprising elements selected from the group consisting of:
vanadium, silicon, aluminum, yttrium, and thorium.

11. A rhenium-base oxidation-resistant alloy, comprising:
at least 50% rhenium by atomic percent; and
at least thirty percent (30%) of the alloy by atomic percent comprising an alloying substance with an affinity for oxygen, the alloying substance at least partially soluble in rhenium, the alloying substance at least partially dissolved in the rhenium, wherein the alloying substance comprises cobalt, chromium and manganese; whereby
an alloy is produced by the combination of the rhenium and the alloying substance that is more resistant to oxidation.

12. A rhenium-base oxidation-resistant alloy as set forth in claim 11, further comprising:
the cobalt being cobalt by atomic percent in a range from approximately 0% to 50%.

13. A rhenium-base oxidation-resistant alloy as set forth in claim 11, further comprising:
the chromium being chromium by atomic percent in a range from approximately 0% to 15%.

14. A rhenium-base oxidation-resistant alloy as set forth in claim 11, further comprising:
the manganese being manganese by atomic percent in a range from approximately 0% to 10%.

15. A rhenium-base oxidation-resistant alloy as set forth in claim 11, further comprising:
nickel.

16. A rhenium-base oxidation-resistant alloy as set forth in claim 15, further comprising:
the nickel being nickel by atomic percent in a range from approximately 0% to 15%.

17. A rhenium-base oxidation-resistant alloy as set forth in claim 11, further comprising elements selected from the group consisting of:
vanadium, silicon, aluminum, yttrium, and thorium.

18. A rhenium-base oxidation-resistant alloy, comprising:
at least 50% rhenium by atomic percent;
at least 30% of an alloying substance by atomic percent with an affinity for oxygen, the alloying substance at least partially soluble in the refractory metal, the alloying substance at least partially dissolved in the refractory metal and including a mixture of at least cobalt, chromium, and manganese;
the cobalt being cobalt by atomic percent in a range from approximately 0% to 50%;
the chromium being chromium by atomic percent in a range from approximately 0% to 15%; and
the manganese being manganese by atomic percent in a range from approximately 0% to 10%; whereby
an alloy is produced by the combination of the refractory metal and the alloying substance that is more resistant to oxidation.

19. A rhenium-base oxidation-resistant alloy as set forth in claim 18, further comprising:
nickel, the nickel being nickel by atomic percent in a range from approximately 0% to 15%.

* * * * *